(12) United States Patent
Yu (10) Patent No.: US 11,905,197 B2
(45) Date of Patent: Feb. 20, 2024

(54) TOOLING DESIGN FOR A SELF-WEIGHT EDGE PRESS MOLDING ELEMENT FOR THIN-SHEET GLASS AND THIN HYBRID-GLASS STACK FORMING

(71) Applicant: CORNING INCORPORATED, Corning, NY (US)

(72) Inventor: Chao Yu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 459 days.

(21) Appl. No.: 16/849,244

(22) Filed: Apr. 15, 2020

(65) Prior Publication Data

US 2020/0331792 A1 Oct. 22, 2020

Related U.S. Application Data (60) Provisional application No. 62/834,664, filed on Apr. 16, 2019.

(51) Int. Cl.
*C03B 23/03* (2006.01)
*C03B 23/025* (2006.01)

(52) U.S. Cl.
CPC ...... *C03B 23/0302* (2013.01); *C03B 23/0252* (2013.01); *C03B 23/0258* (2013.01)

(58) Field of Classification Search
CPC ...... C03B 23/0256–03; C03B 23/0307; C03B 23/0305; C03B 40/005; C03B 40/02
See application file for complete search history.

(56) References Cited

U.S. PATENT DOCUMENTS

| | | | | |
|---|---|---|---|---|
| 3,348,935 A | * | 10/1967 | Carson | C03B 23/027 65/288 |
| 5,049,178 A | * | 9/1991 | Pereman | C03B 23/027 65/273 |
| 5,178,659 A | * | 1/1993 | Watanabe | C03B 23/0235 65/106 |
| 5,306,324 A | * | 4/1994 | Vehmas | C03B 40/005 65/273 |
| 5,679,124 A | * | 10/1997 | Schnabel, Jr. | C03B 35/202 65/273 |
| 5,882,370 A | * | 3/1999 | Garner | C03B 23/027 65/106 |
| 6,276,173 B1 | * | 8/2001 | Vanhuysse | C03B 35/145 428/605 |
| 6,629,436 B1 | * | 10/2003 | Skeen | C03B 23/027 65/102 |
| 7,401,477 B2 | * | 7/2008 | Inoue | C03B 23/0235 65/273 |
| 11,434,161 B2 | * | 9/2022 | Ash | C03B 23/0307 |
| 2005/0092028 A1 | * | 5/2005 | Blanc | C03B 23/027 65/291 |

(Continued)

FOREIGN PATENT DOCUMENTS

FR 3080111 A1 * 10/2019 ......... C03B 23/0252
WO WO-2019077277 A1 * 4/2019 ......... C03B 23/0256

*Primary Examiner* — Jodi C Franklin (57) ABSTRACT

An edge-press molding element is part of a glass-bending tooling that includes a contoured-ring, gasket form factor. The edge-press molding element operates by self-weight bending a glass pane under a thermal load. The glass pane bends under molding conditions where a temperature differential of as low as 30° C. up to 100° C. is achieved between an edge of the glass pane and the center.

13 Claims, 7 Drawing Sheets

(56) References Cited

U.S. PATENT DOCUMENTS

| | | | |
|---|---|---|---|
| 2010/0064730 A1* | 3/2010 | Tetlow | C03B 23/027 65/287 |
| 2012/0288661 A1* | 11/2012 | Wei | C03B 23/02 65/102 |
| 2013/0091896 A1* | 4/2013 | Nitschke | C03B 23/03 65/106 |
| 2013/0199243 A1* | 8/2013 | Mori | C03B 40/005 65/106 |
| 2013/0298608 A1* | 11/2013 | Langsdorf | C03B 23/035 65/106 |
| 2014/0165653 A1* | 6/2014 | DeAngelis | C03B 23/025 65/29.14 |
| 2015/0152002 A1* | 6/2015 | DeAngelis | C03B 23/027 65/29.14 |
| 2015/0344346 A1* | 12/2015 | Jiao | C03B 23/0258 65/29.11 |
| 2019/0315647 A1* | 10/2019 | Yu | C03B 23/027 |
| 2020/0346965 A1* | 11/2020 | Machura | C03B 23/03 |
| 2021/0087097 A1* | 3/2021 | Ash | C03B 23/0252 |
| 2021/0317029 A1* | 10/2021 | Myl | C03B 29/00 |

* cited by examiner

TOOLING DESIGN FOR A SELF-WEIGHT EDGE PRESS MOLDING ELEMENT FOR THIN-SHEET GLASS AND THIN HYBRID-GLASS STACK FORMING

CROSS-REFERENCE TO RELATED APPLICATIONS

This application claims the benefit of priority under 35 U.S.C. § 119 of U.S. Provisional Application Ser. No. 62/834,664 filed on Apr. 16, 2019 the content of which is relied upon and incorporated herein by reference in its entirety.

FIELD

This disclosure relates to gravity-assisted contoured glass-bending formation.

BACKGROUND

Glass bending, particularly for vehicular applications, experiences edge-buckling challenges, among others, where increasingly thinner glass products are used, including single-sheet and hybrid-stack glass panes.

BRIEF DESCRIPTION OF THE DRAWINGS

Disclosed embodiments are illustrated by way of example, and not by way of limitation, in the figures of the accompanying drawings where like reference numerals may refer to similar elements, in which.

DETAILED DESCRIPTION

Vehicular window tooling design embodiments are disclosed that assist with useful finished products where edge-buckling defects are avoided. The window tooling design is used for automobile products and other vehicles.

Processing conditions that use disclosed edge-press molding-element embodiments, allow for useful high temperature-differential profiles during glass bending, such as a 100° C. temperature-differential profile or higher, measured from an edge to the approximate center of a glass pane under thermal and gravity bending loads. Temperature-differential profiles as low as 30° C. are also achieved with no detectible edge buckling. The relatively high temperature-differential profiles include higher temperatures at the center of the glass pane, and lower temperatures at the edges of the glass pane.

Disclosed edge-press molding-element embodiments pressurize glass edges during glass bending and simultaneously resist the occurrence of edge buckling under useful thermal and gravity loads.

Edge-press molding-element embodiments act as a heat sink during glass heating due to useful heat diffusivity such that a lower edge temperature is maintained, and a consequent higher temperature differential is achieved between glass edge and glass center. Consequently disruptive edge buckling is virtually eliminated under several disclosed embodiments, while useful higher temperature differentials are achieved.

Disclosed embodiments include processing a singlet, thin-sheet bending of soda-lime glass (SLG) material that may have a thickness range from about 0.55 mm to about 1.0 mm. Disclosed embodiments include processing a singlet, thin-sheet bending of Gorilla Glass® (GG) material that may have a thickness range from about 0.55 mm to about 1.0 mm. Disclosed embodiments also include processing thin hybrid-stack bending with SLG and GG composite materials that may have an SLG thickness of about 2.1 mm and a GG thickness of about 0.7 mm. A GG composition may include an aluminosilicate material. In an embodiment, the GG composition is an aluminosilicate material with an additive of potassium and magnesium and sodium.

Figure 1:
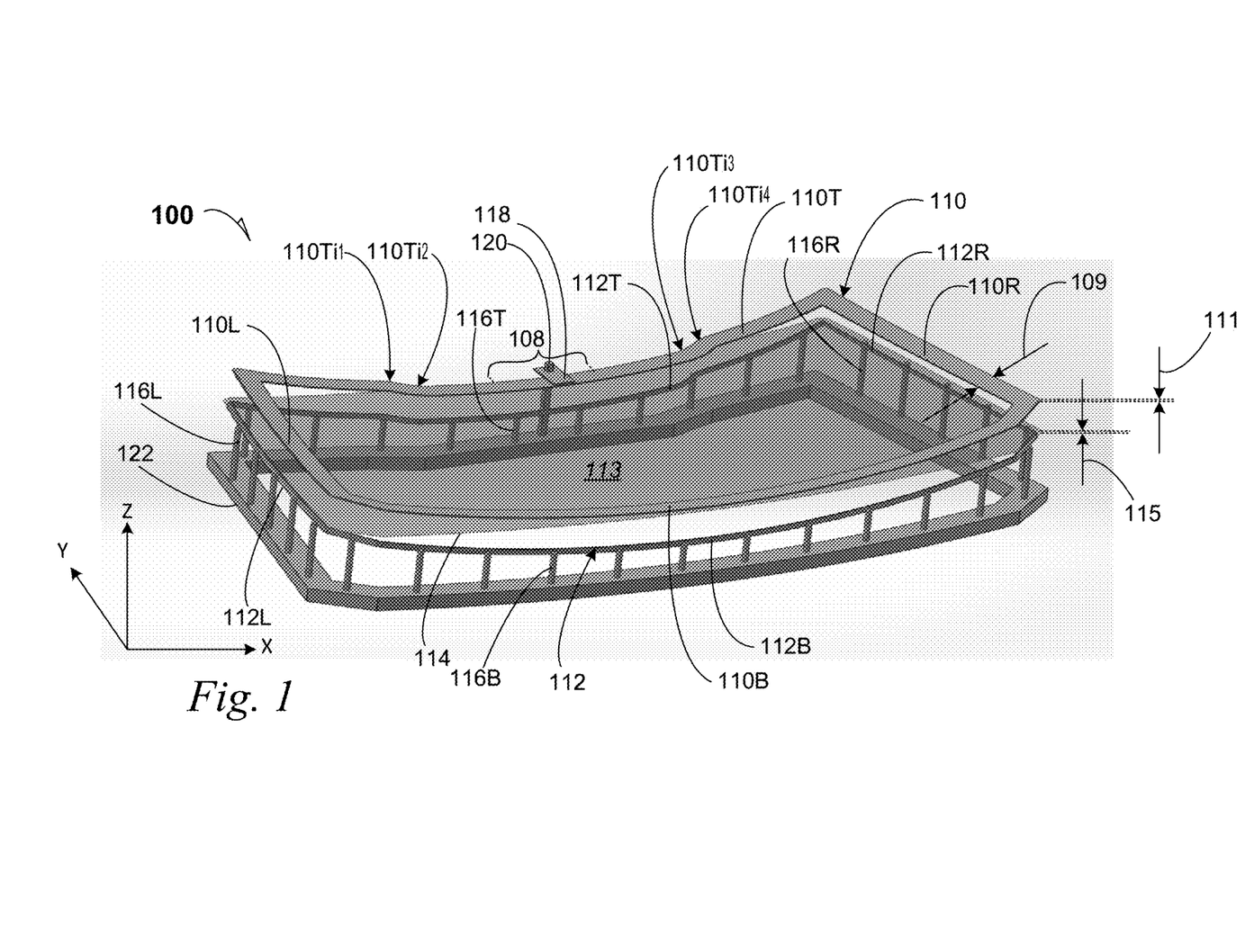
FIG. 1 is a perspective elevation of a tooling design for a self-weight, edge-press molding element in an assembly including a glass pane under glass-bending conditions according to several embodiments.

FIG. 1 is a perspective elevation of a tooling design for a self-weight, edge-press molding element assembly 100 including a glass pane 114 under glass-bending conditions according to several embodiments. Thermal differential control is applied to the glass pane 114 while being manipulated by a glass-bending tooling. Processing embodiments that use a self-weight, edge-press molding element 110, achieves no derogatory edge buckling, both for singlet SLG or GG, and hybrid-stack SLG/GG glass panes.

A self-weight, edge-press molding element 110 has a 3-dimensional contour that is complementary to a tooling rail 112 on which a glass pane 114 is resting. The 3-dimensional contour includes a periphery that follows the edges of the glass pane 114, and a Z-direction contour that descends from e.g., the left edge 110L, reaches a low region at a center vertical symmetry zone 108, and that ascends to e.g., the right edge 110R. The tooling rail 112 can have dimensions of 2 to 4 mm width and a height of 10 to 30 mm according to an embodiment. In an embodiment, the tooling rail 112 can be characterized to have a "fence" contoured-ring form factor as the height is greater than the width. The tooling rail 112 can also be a substantially round bar of steel that has been contoured. Other dimensions for the tooling rail 112 may be selected, depending upon a useful edge-press molding element design.

A protective coating (see Item 634 in FIG. 6) is applied to the tooling rail 112 on the surfaces that are to come in contact with the glass pane 114. In an embodiment, the protective coating 634 is a boron nitride material to enhance contact-surface smoothness that is useful for bending automobile glass panes. In an embodiment, the protective coating 634 is a metal carbide material to enhance contact-surface durability under extensive repeated glass-bending operations.

In an embodiment, a protective coating (see Item 130 in FIG. 1B and Items 630 and 634 in FIG. 6) is applied to the self-weight edge-press molding element 110 on surfaces that are to come in contact with the glass pane. In an embodiment, the protective coating 630 is a boron nitride material to enhance contact-surface smoothness that is useful for bending automobile glass panes. In an embodiment, the protective coating 630 is a metal carbide material to enhance contact-surface durability under extensive repeated glass-bending operations.

As the glass pane 114 is depicted before completion of the glass-bending process, the glass pane 114 is touching the tooling rail 112 at a left rail section 112L and at a right rail section 112R. In an embodiment, the glass pane 114 is suspended as illustrated, above a top rail section 112T and above a bottom rail section 112B because of initial gravity-caused deformation. As heating and self-weight glass bending caused of the edge-press molding element 110 is initiated, the glass pane 114 continues to deflect and eventually, the edge-press molding element 110 brings the glass pane 114 into full contact along the tooling rail 112 from below, as well as along the edge-press molding element 110 from above.

The tooling rail 112 has an overall contour that is larger and complementary in shape, compared to the contour of the edge-press molding element 110. The two complementary shapes and sizes are configured, proportional to the thickness 115 of the glass pane 114. For example, where the glass pane 114 exhibits a cabin surface 113 configured for an automobile interior, the edge-press molding element 110 has curvature contours that are smaller than the complementary overall curvature contours of tooling rail 112. Opposite the cabin surface 113 is an exterior surface that is facing downward.

The curvature contour differences between the tooling rail 112 and the edge-press molding element, are proportional in part to a selected thickness of the glass pane 114. In particular, a left edge-press molding section 110L has a smaller arc of curvature (curving in the Z-direction) than that of the left rail section 112L. A right edge-press molding section 110R has a smaller arc of curvature than that of the right rail section 112R. A top edge-press molding section 110T has a smaller arc of curvature than that of the top rail section 112T. And a bottom edge-press molding section 110B has a smaller arc of curvature than that of the bottom rail section 112B.

In an embodiment, the tooling rail 112 is supported and held to several contours by a series of support bars, one occurrence of which is indicated by reference number 116L, which is a support bar 116L along the tooling rail left rail section 112L. Similarly, the tooling rail 112 is supported and held to several contours by a series of support bars, one occurrence of which is indicated by reference number 116R, which is a support bar 116R along the tooling rail right rail section 112R. Similarly, the tooling rail 112 is supported and held to several contours by a series of support bars, one occurrence of which is indicated by reference number 116T, which is a support bar 116T along the tooling rail top rail section 112T. Similarly, the tooling rail 112 is supported and held to several contours by a series of support bars, one occurrence of which is indicated by reference number 116B, which is a support bar 116B along the tooling rail bottom rail section 112B. Where more than four edges of the glass pane 114 are present, more support bars may be employed to control a useful contour of the tooling rail 112.

In an embodiment, the edge-press molding element 110 is made from a steel material such as mild steel. In an embodiment, the edge-press molding element 110 is made from a steel material such as a stainless steel. Other materials may be selected depending upon useful properties that assist in contouring the glass pane 114 and in controlling edge-buckling defects during glass bending.

Figure 1A:
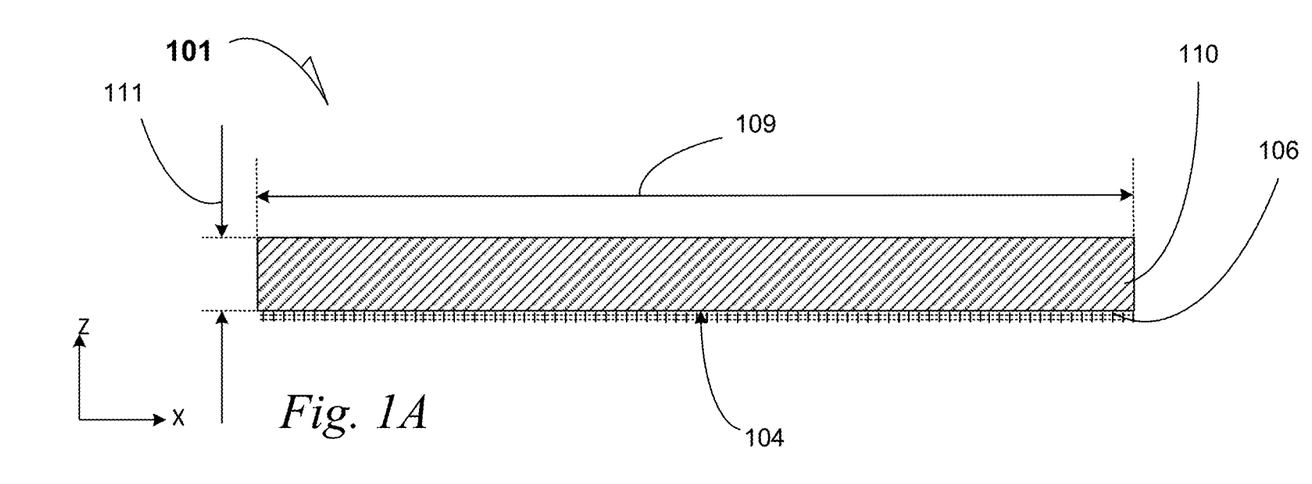
FIG. 1A is a cross-section elevation detail of a portion of the edge-press molding element depicted in FIG. 1 according to an embodiment.

FIG. 1A is a cross-section elevation detail 101 of a portion of the self-weight, edge-press molding element 110 depicted in FIG. 1 according to an embodiment. In an embodiment, a cushion layer 106 is applied to the edge-press molding element 110 as a non-concussive contact material of the edge-press molding element 110 on to the glass pane 114. The cushion layer 106 is attached to a contact surface 104 of the edge-press molding element 110.

The cushion layer 106 facilitates minimal glass marking onto the glass pane 114. In an embodiment, the cushion layer 106 is a stainless-steel cloth that is welded onto the edge-press molding element 110, such that direct-contact heat transfer through the metallic material of the edge-press molding element 110 is minimized. Where direct contact of the edge-press molding element 110 is prevented by the cushion layer 106, the cushion layer 106 transfers the downward force of the self-weight glass-bending effect of the edge-press molding element 110. A progressive temperature differential is maintained within the glass pane 114 and the peripheral nature of the edge-press molding element 110, facilitates lower periphery temperatures of the glass pane 114. The stainless-steel cloth 106 allows heat flow to be principally conducted through the glass pane 114, from a heating element. In an embodiment, the cushion layer 106 is a Bekaert NP400 product.

In an embodiment, the cushion layer 106 is thinner (Z-direction) than the edge-press molding element 110. In an embodiment, the relative thicknesses are 0.2:1 for the cushion layer 106 to the edge-press molding element 110.

Figure 1B:
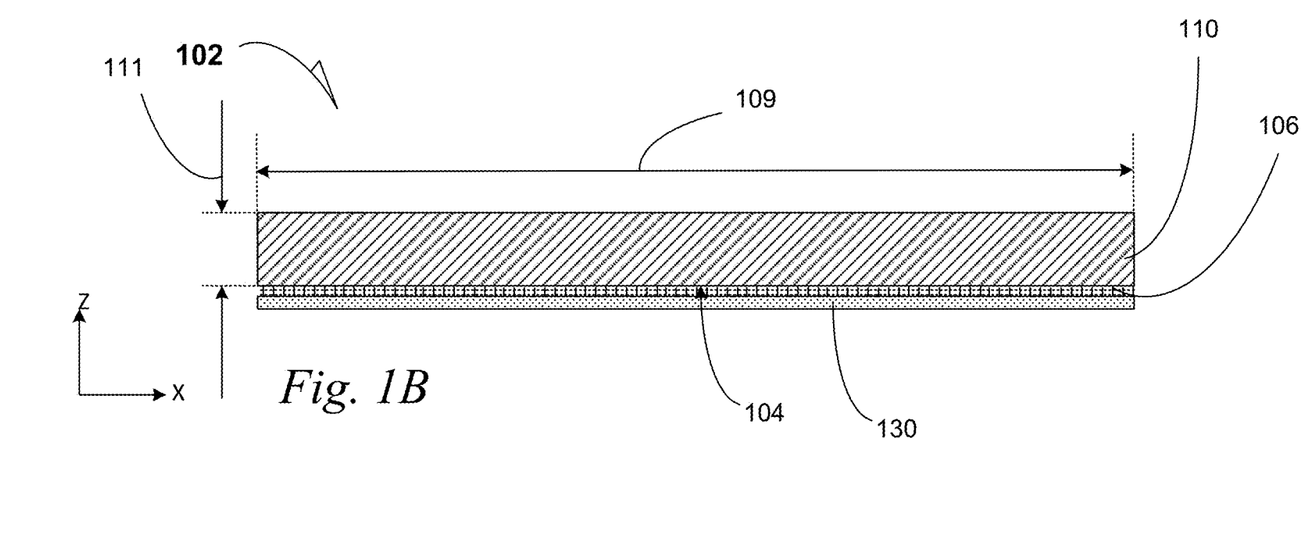
FIG. 1B is a cross-section elevation detail of a portion of the self-weight, edge-press molding element depicted in FIG. 1 according to an embodiment.

FIG. 1B is a cross-section elevation detail 102 of a portion of the self-weight, edge-press molding element 110 depicted in FIG. 1 according to an embodiment. Other materials may be chosen as the cushion layer 106, such as a ceramic film 130 and metal composite 106, where the ceramic film 130, as a lower-than-metal heat conductor, contacts the glass pane 114, and the metal 106 is a mesh that contacts the contact surface 104 and that is usefully compressive. The ceramic film 130 may be bonded to the cloth 106.

In an embodiment, the cushion layer 106 and the ceramic film 130 are thinner (Z-direction) than the edge-press molding element 110. In an embodiment, the relative thicknesses are 0.3:1 for the cushion layer 106 and the ceramic film 130, to the edge-press molding element 110.

In reference to FIGS. 1A and 1B, the cushion layer 106 is capable of compressing about 10 percent in the Z-direction under useful glass-bending conditions, where the glass pane 114 transitions from elastic to viscoelastic, and the edge-press molding element 110 under self-weight, compresses the cushion layer 106 while the edge-press molding element 110 continuously compresses the glass pane 114 onto the tooling rail 112.

Attention is directed to FIG. 1. In an embodiment, a conventional sliding-track mechanism (not illustrated) is used that exhibits five degrees of freedom (5 DOF) control that ensures zero displacement of the glass pane 114, within automobile glass constraints, except in the negative-Z direction where gravity bending is accomplished, along with the self-weight edge-bending of the glass pane 114, as delivered by the edge-press molding element 110. The sliding-track mechanism is coupled to a base 122.

In an embodiment, the edge-press molding element 110 has a thickness 111 (Z-direction) in a range from 2 millimeters (mm) to 15 mm. In an embodiment, the edge-press molding element 110 has a thickness 111 of 10 mm. In an embodiment, the edge-press molding element 110 has a breadth 109 in a range from 5 mm to 50 mm. In an embodiment, the edge-press molding element 110 has a breadth 109 of 30 mm. In an embodiment, the edge-press molding element 110 is made of a stainless-steel material, and it has a thickness 111 of 10 mm and a breadth 109 of 30 mm. In an embodiment, the edge-press molding element 110 is made of a stainless-steel material, and it has a thickness 111 of 10 mm and a breadth 109 of 50 mm. In an embodiment, the edge-press molding element 110 can be characterized to have a contoured "gasket" edge-press form factor as the width 109 is greater than the thickness 111. Even where the tooling rail 112 may be a substantially circular bar in cross section, it retains a contoured ring form factor, and the edge-press molding element 110 has a complementary-contoured gasket form factor.

In an embodiment, the edge-press molding element 110 includes inflections in the contour for a given useful finished glass pane such as for an automobile windshield. Each inflection creates at least a changed lateral layout in the X-Y direction as the gasket form factor is followed. Overall, however, the edge-press molding element 110 may have a continuously increasing Z-direction, until the center vertical symmetry zone 108 is reached. For example, a first top inflection $110Ti_1$ is observed, and moving from left to right, a second top inflection $110Ti_2$ resolves the first top inflection $110Ti_1$. Further observing from left to right, a third top inflection $110Ti_3$ is observed, and it is resolved by a fourth top inflection $110Ti_4$.

In an embodiment, an asymmetrical glass pane 114 is achieved, by bending with the edge-press molding element 110, where the symmetry zone 108 is shifted toward the left by e.g., one-third, where approximately the first top inflection $110Ti_1$ occurs. This form factor may be referred to as an asymmetrical gasket form factor.

A stabilizer 118 is affixed to the edge-press molding element 110, to hold a fiducial position upon the glass pane 114 during the self-weight edge press-molding process. In an embodiment, the stabilizer 118 is lowered by gravitational force of the edge-press molding element 110, and the lowering direction is guided by a stabilizer rail 120 that is slidingly in contact with the base 122. As the edge-press molding element 110 moves downwardly (negative-Z direction) under useful heating conditions, the stabilizer 118 holds the edge-press molding element 110 to a useful X-Y fiducial position above and on the glass pane 114 as the glass pane 114 conforms under thermal load to both the tooling rail 112 and in complementary fashion in continuous and progressive-contact to the edge-press molding element 110. Other manipulation of the glass pane 114 includes five degrees of freedom positioning of the glass pane 114 that may be controlled by attachments to the base 122.

In an embodiment, the glass pane 114 is a singlet 114 of glass material that has a thickness 115 of 0.7 mm. In an embodiment, the glass pane 114 is a singlet 114 of glass material that has a thickness 115 in a range from about 0.3 mm to about 1.0 mm. During processing as the glass pane 114 transitions from elastic to viscoelastic states, the edge-press molding element 110 under gravitational load, makes progressive and increasing contact with the glass pane 114, starting at the left- and right edges where contact is made on the tooling rail 112. A glass-bending embodiment is completed as self-weight pressing of the edge-press molding element 110 is arrested when the edge-press molding element 110 and the tooling rail 112 are each in full contact with the glass pane 114. Further, the edge-press molding element 110 is in full contact on the cabin surface 113, as the glass-bending embodiment is completed. Thereafter, the glass pane 114 is removed and allowed to cool.

In a processing embodiment, the base 122, the several support bars 116, and the tooling rail 112 are attached to a conveyor system that carries the glass pane 114 as well as the edge-press molding element 110 into and through a glass-heating oven. Gravity bending is assisted under heat load, by the self-weight edge-press molding element 110, and a delta-T of about 30° C. or greater is achieved between the center region 113 and the lateral edges of the glass pane 114. A higher temperature differential may be used such as between 30° C. and 100° C.

Thermal control of the glass pane 114 during glass bending, can be achieved in part by thermal shielding using known techniques. Additionally with use of the edge-press molding element 110, the self-weight glass-bending effect on the glass pane 114 allows the glass pane 114 to be placed under thermal load temperature differential of about 30° C. or greater, such as up to 100° C., to be conformally bent to the tooling rail 112, as well as to the complementary contour of the edge-press molding element 110.

Figure 2A:
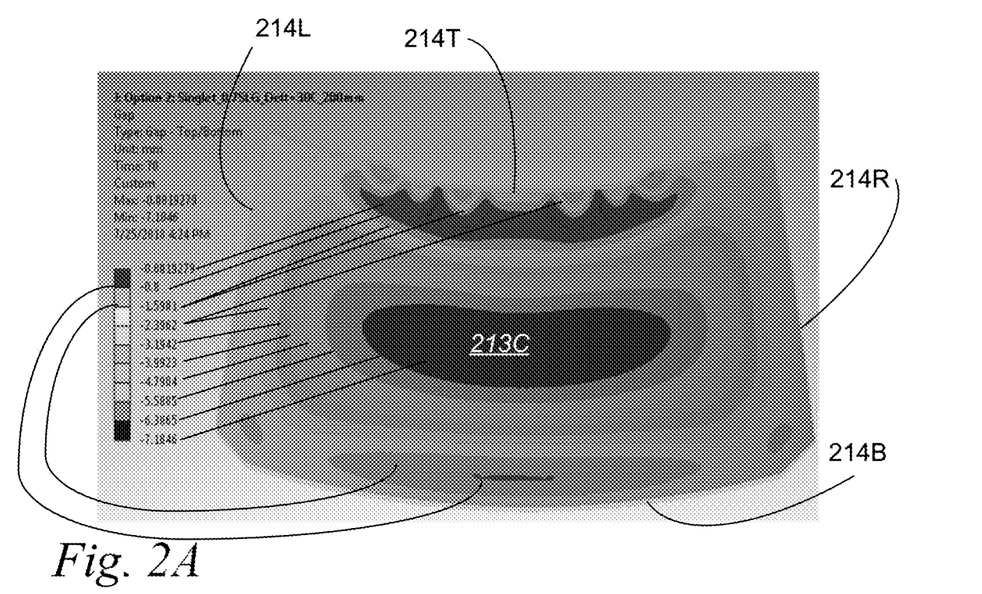
FIG. 2A is a contour diagram that exhibits design deviations on a molded glass pane using only a tooling rail.

FIG. 2A is a contour diagram that exhibits design deviations on a molded glass pane using only a tooling rail. A singlet pane of soda lime glass is placed upon a tooling rail and heat is applied to cause the glass pane to bend under gravity. A temperature differential of 30° C. is achieved between a center region 213C of the glass pane where the cabin surface 113 is indicated in FIG. 1, and the respective edges including top 214T, bottom 214B, left 214L and right 214R edges. Deviations from design planarity are indicated in millimeters. As indicated, a maximum deviation from design planarity is −7.1846 mm at an enclave center region 213C. Although the lowest deviation from planarity is about −0.0019 mm, several exclave deviations from planarity encroach from the top edge 214T, where edge buckling is present as shown in FIG. 2A.

Figure 2B:
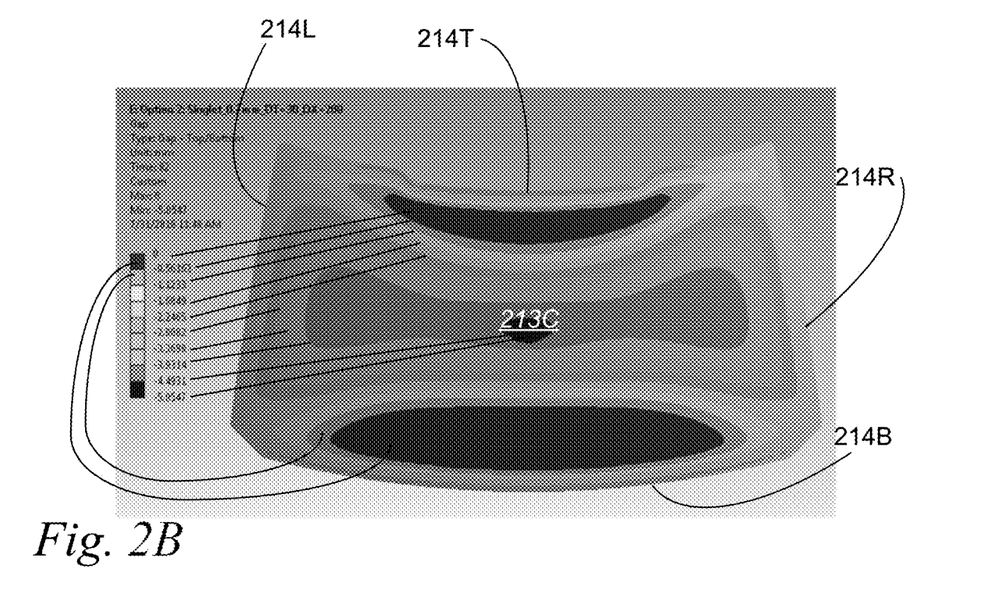
FIG. 2B is a contour diagram using disclosed embodiments, that exhibits design deviations while glass bending that uses an edge-press molding element such as the edge-press molding element depicted in FIGS. 1 and 1A.

FIG. 2B is a contour diagram using disclosed processing embodiments, that exhibits design deviations while glass bending that uses an edge-press molding element such as the edge-press molding element 110 depicted in FIG. 1. A singlet pane of soda lime glass is placed upon a tooling rail and heat is applied to cause the glass pane to bend under gravity. A temperature differential of 30° C. is achieved between a center region 213C of the glass pane that includes the cabin surface 113 indicated in FIG. 1, and the respective edges including top 214T, bottom 214B, left 214L and right 214R edges. Deviations from design planarity are indicated in millimeters. As indicated, a maximum deviation from design planarity is −5.0547 mm at an enclave center region 213C. Although the lowest deviations from planarity are zero or close to zero, no exclave deviations from planarity are present because the edge-press molding element 110 resists edge buckling. As depicted along the several edges in comparison to FIG. 2A, no groupings of exclave deviations from design planarity are depicted.

Figure 3A:
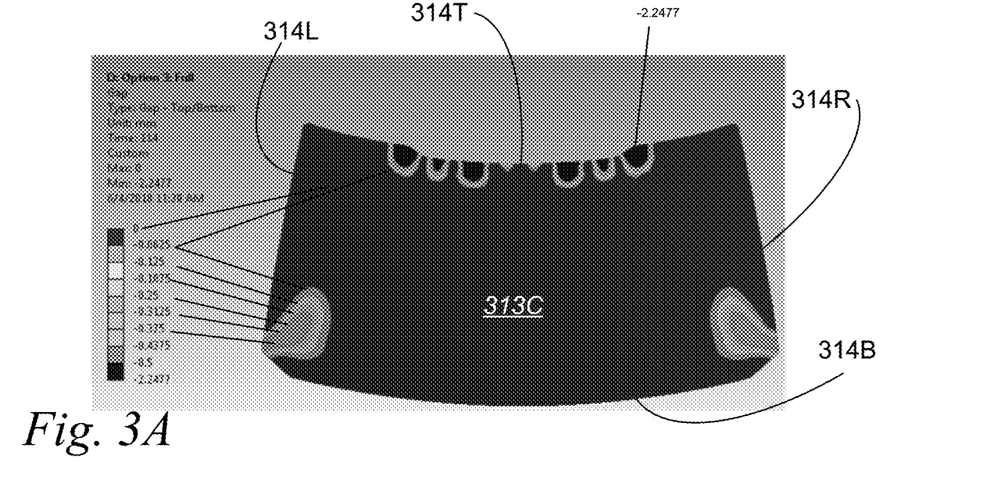
FIG. 3A is a contour diagram that exhibits design deviations during glass bending of a hybrid-glass stack using only a tooling rail.

FIG. 3A is a contour diagram that exhibits design deviations during glass bending of a hybrid-glass stack using only a tooling rail. A soda lime glass that is 1.2 mm, and Gorilla Glass® that is 0.7 mm are assembled as a doublet pane stack, and it is placed upon a tooling rail and heat is applied to cause the glass-pane stack to bend under gravity. A temperature differential of 30° C. is achieved between a center region 313C of the glass pane where the cabin surface 113 is indicated in FIG. 1, and the respective edges including top 314T, bottom 314B, left 314L and right 314R edges. Deviations from design planarity are indicated in millimeters. As indicated, a maximum deviation from design planarity is −2.2477 mm at a grouping of exclave regions along the top edge 314T, where edge buckling is present as shown in FIG. 3A. At the approximate corners between left 314L and bottom 314B edges, as well as right 314R and bottom 314B edges, edge buckling is exhibited, and the maximum deviation from design planarity is about −0.375 mm.

Figure 3B:
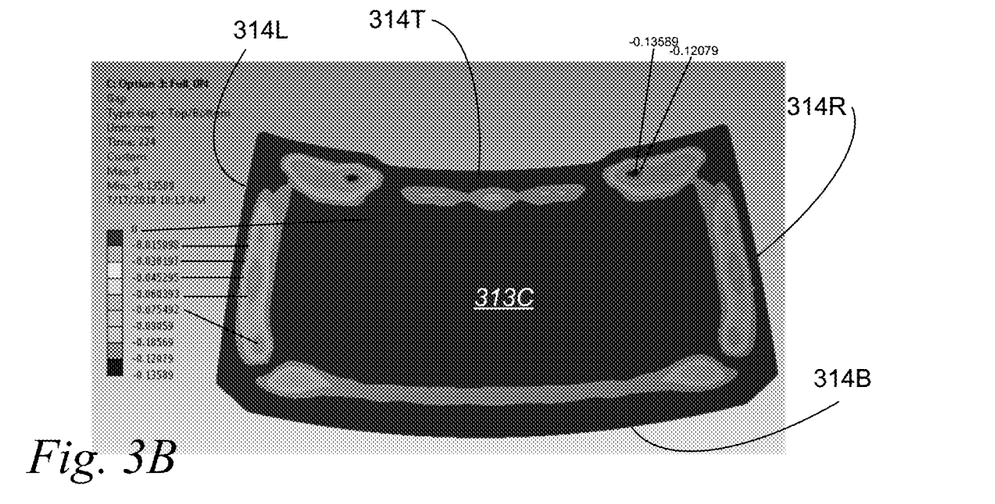
FIG. 3B is a contour diagram using disclosed embodiments, that exhibits design deviations while glass bending of a hybrid-glass stack using an edge-press molding element such as the edge-press molding element depicted in FIGS. 1 and 1A.

FIG. 3B is a contour diagram using disclosed embodiments, that exhibits design deviations while glass bending of a hybrid glass stack using an edge-press molding element such as the edge-press molding element 110 depicted in FIG. 1. A soda lime glass of 1.2 mm and Gorilla Glass® of 0.7 mm is assembled in a doublet glass-pane stack and it is placed upon a tooling rail and heat is applied to cause the glass pane to bend under gravity. A temperature differential of 30° C. is achieved between a center region 313C of the glass pane that includes the cabin surface 113 indicated in FIG. 1, and the respective edges including top 314T, bottom 314B, left 314L and right 314R edges. Deviations from design planarity are indicated in millimeters. As indicated, a maximum deviation from design planarity is −0.13589 mm at two enclave regions near the top edge 314T. The lowest deviations from planarity are zero or close to zero, including all regions near each of the several edges 314L, 314T, 314R and 314B, as well as most of the center region 313C. Edge buckling is represented at all edges to be zero millimeters. If edge buckling is present, it is below useful limits of detectability.

Figure 4A:
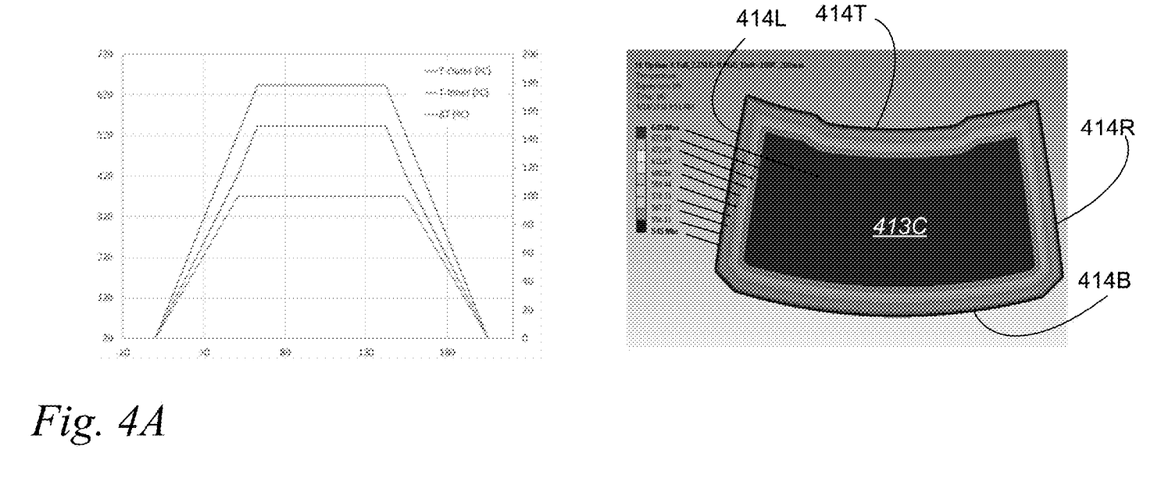
FIGS. 4A and 4B illustrate a process diagram and a glass pane, where processing temperature (right ordinate) and temperature differential (right ordinate) are mapped between edges and the center of a glass pane under glass-bending techniques, and where an edge-press molding element is applied according to several embodiments.
Figure 4B:
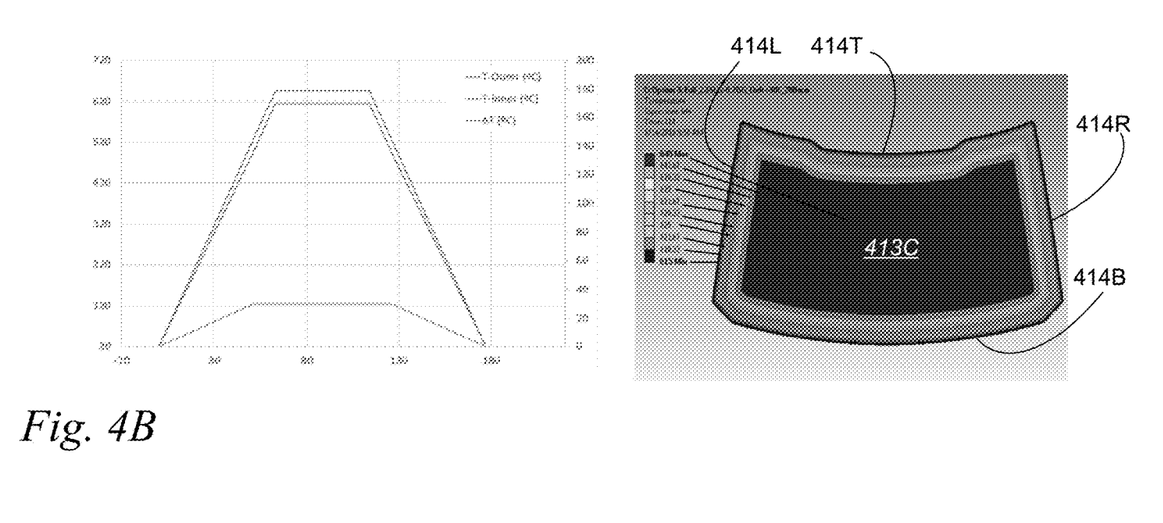

FIGS. 4A and 4B illustrate a process diagram and a glass pane, where processing temperature (right ordinate) and temperature differential (right ordinate) are mapped between edges and the center of glass pane under glass-bending techniques, and where an edge-press molding element is applied according to several embodiments. Temperature differential is mapped between edges and the center 413C of a glass pane under glass-bending techniques, and where an edge-press molding element is applied according to several embodiments. Differential heating techniques are applied to an SLG-GG hybrid with 2.1 mm SLG and 0.7 mm GG thicknesses. The GG is on the cabin side of the glass pane 114.

In FIG. 4A, a three-minute (180 second) heating-cooling cycle is exhibited along the abscissa. The outer-edge temperature is depicted in a curve between an inner-region temperature curve and a delta-T temperature curve. As depicted, delta-T is constrained to within 100° C. or less.

By use of the edge-press molding tooling design embodiments, such as the edge-press molding element 110 depicted in FIG. 1, a delta-T of 100° C. is achieved, and edge buckling is minimized. Where the edge-press molding tooling design embodiments are used, a delta-T of about 100° C. is used, and edge buckling is also minimized. Temperatures at the several edges 414L, 414R, 414T and 414B are maintained at about 545° C., and temperatures progress to a maximum of 645° C. in a central region 413C. Edge defects are minimized or below detection by use of this processing embodiment.

In FIG. 4B, similar processing is done using an edge-press molding element, including where a three-minute (180 second) heating-cooling cycle is exhibited along the abscissa. The outer-edge temperature is depicted in a curve between an inner-region temperature curve and a delta-T temperature curve. As depicted, delta-T is constrained to within 30° C. or higher.

Figure 5:
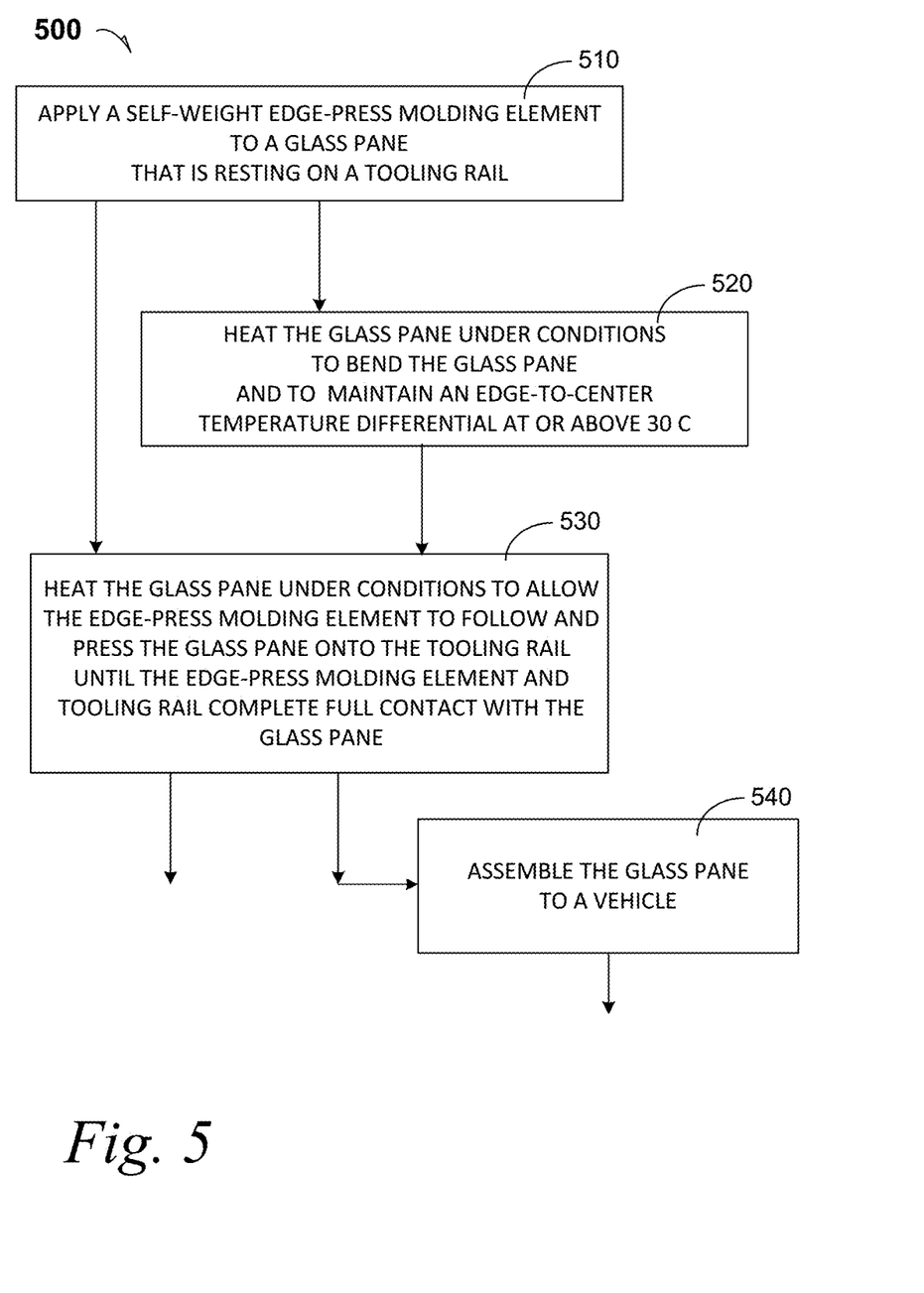
FIG. 5 is a process flow diagram according to several embodiments.

FIG. 5 is a process flow diagram 500 according to several embodiments.

At 510, the process includes applying a self-weight edge-press molding element to a glass pane that is resting on a tooling rail.

At 520, the process includes heating the glass pane under conditions to bend the glass pane and to maintain an edge-to-center temperature differential at or above 30° C., and as high as 100° C.

At 530, the process includes heating the glass pane under conditions to allow the edge-press molding element to follow and press the glass pane onto the tooling rail until the edge-press molding element and tooling rail complete full contact with the glass pane. In a non-limiting example embodiment, the temperature differential is between 30° C. and 100° C.

At 540, the process includes assembling the bent glass pane to a vehicle. In a non-limiting example embodiment, the vehicle is a motor vehicle for passenger transportation.

Figure 6:
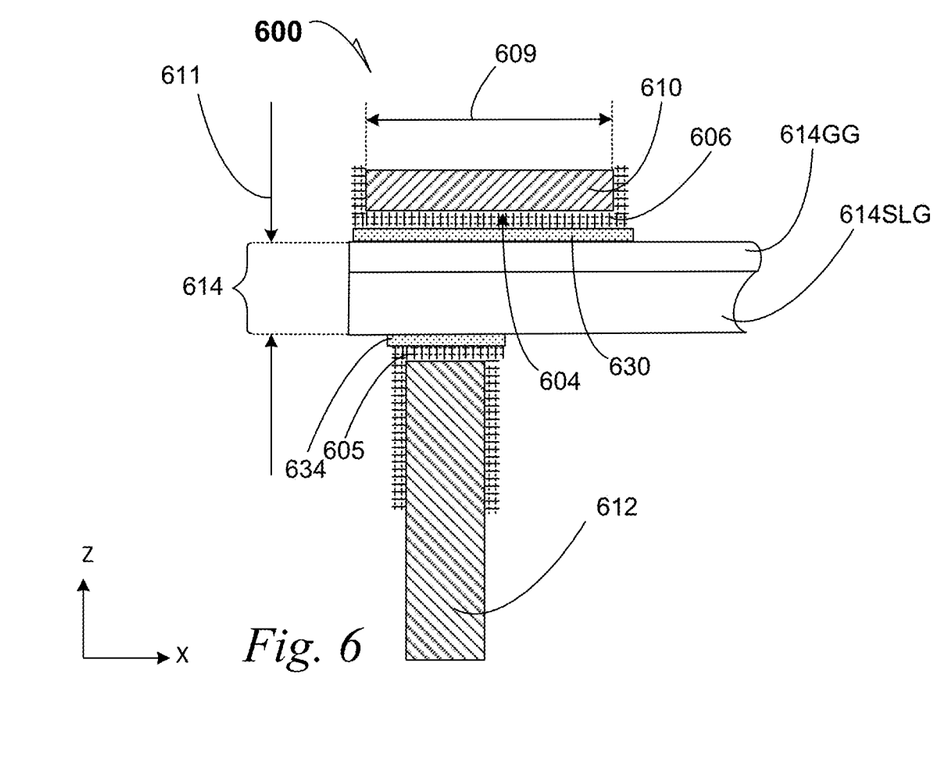
FIG. 6 is a cross-section cut away of an edge-press molding element and a tooling rail where each of the edge-press molding element and tooling rail have protective coatings and cushion layers and according to several embodiments.

FIG. 6 is a cross-section cut away 600 of an edge-press molding element 610 and a tooling rail 612 where each of the edge-press molding element 610 and tooling rail 612 have protective coatings and cushion layers 606 and 605 according to several embodiments. The cushion layer 606 is attached to a contact surface 604 of the edge-press molding element 610. In an embodiment, the edge-press molding element 610 has a thickness 611 of 10 mm. In an embodiment, the edge-press molding element 610 has a breadth 609 in a range from 5 mm to 50 mm. In an embodiment, the edge-press molding element 610 has a breadth 609 of 30 mm.

An asymmetric glass stack 614 includes a top ply 614GG such as a Gorilla Glass®, and a bottom ply 614SLG such as a soda lime glass. In an embodiment, a single glass pane such as the glass pane 114 depicted in FIG. 1 is provided.

The cushion layer 606 is applied by wrapping it to the edge-press molding element 610 as a non-concussive contact material. A protective coating 630 is bonded to the cushion layer 606 where contact is made to a thin ply 614GG of an asymmetric glass stack 614.

The cushion layer 606 facilitates minimal glass marking onto the thin glass ply 614GG. In an embodiment, the cushion layer 606 is a stainless-steel cloth 606 that is welded onto the edge-press molding element 610, such that direct-contact heat transfer through the metallic material of the edge-press molding element 610 is minimized. Where direct contact of the edge-press molding element 610 is prevented by the cushion layer 606, the cushion layer 606 transfers the downward force of the self-weight glass-bending effect of the edge-press molding element 610. A progressive temperature differential is maintained within the glass pane 614 and the peripheral nature of the edge-press molding element 610, facilitates lower periphery temperatures of the glass pane 614. The stainless-steel cloth 606 allows heat flow to be principally conducted through the glass pane 614, from a heating element. In an embodiment, the cushion layer 606 is a Bekaert NP400 product.

In an embodiment, the cushion layer 605 is welded to the tooling rail 612.

The cushion layer 605 facilitates minimal glass marking onto the bottom ply 614SLG. In an embodiment, the cushion layer 605 is a stainless-steel cloth 605 that is welded onto the tooling rail 612, such that direct-contact heat transfer through the metallic material of the tooling rail 612 is minimized. Where direct contact of the tooling rail 612 is prevented by the cushion layer 605, the cushion layer 605 transfers the reacting upward force of the tooling rail 612 to counter the self-weight glass-bending effect of the edge-press molding element 610.

A progressive temperature differential is maintained within the glass pane 614 and the peripheral nature of the edge-press molding element 610, facilitates lower periphery temperatures of the glass pane 614. The stainless-steel cloth 605 allows heat flow to be principally conducted through the glass pane 614, from a heating element. In an embodiment, the cushion layer 605 is a Bekaert NP400 product.

In an embodiment, at least one protective coating 630 and 634 is applied to the respective self-weight edge-press molding element 610 and tooling rail 612 on surfaces that are to come in contact with the glass pane 614. In an embodiment, the protective coatings 630 and 634 are a boron nitride material to enhance contact-surface smoothness that is useful for bending automobile glass panes. In an embodiment, the protective coating 630 and 634 are a metal carbide material to enhance contact-surface durability under extensive repeated glass-bending operations. In an embodiment, only the cushion layer 606 contacts the glass pane 614GG, but a protective coating 634 contacts the glass pane 614SLG.

In an embodiment, only the cushion layer 605 contacts the glass pane 614SLG, but a protective coating 630 contacts the glass pane 614GG. To illustrate the self-weight edge-press molding element tooling embodiments and methods disclosed herein, a non-limiting list of examples is provided herein:

Example 1 is a glass-bending tooling, comprising: a contoured tooling rail; an edge-press molding element, wherein the edge-press molding element has a gasket form factor and that has a complementary contour to the contoured tooling rail; and a cushion layer on a contact surface of the edge-press molding element.

In Example 2, the subject matter of Example 1 optionally includes wherein the cushion layer is a stainless-steel cloth.

In Example 3, the subject matter of any one or more of Examples 1-2 optionally include wherein the cushion layer is a stainless-steel cloth, wherein the edge-press molding element has a first thickness and the cushion layer has a second thickness that is less than the first thickness.

In Example 4, the subject matter of any one or more of Examples 1-3 optionally include wherein the gasket form factor includes a width-to-thickness ratio in a range from 10:1 to 3:1.

In Example 5, the subject matter of any one or more of Examples 1-4 optionally include wherein the edge-press molding element includes a stainless-steel material, and the gasket form factor includes a width-to-thickness ratio in a range from 10:1 to 3:1.

In Example 6, the subject matter of any one or more of Examples 1-5 optionally include wherein the edge-press molding element includes a stainless-steel material, further including a stabilizer on the edge-press molding element, wherein the stabilizer maintains a fiduciary configuration of the edge-press molding element with respect to the tooling rail.

In Example 7, the subject matter of any one or more of Examples 1-6 optionally include wherein the contoured tooling rail includes left-right-top- and bottom rail sections, further including: a series of support bars that extend from a base and supports the tooling rail, including a left series that supports the left-rail section, a right series that supports the right-rail section, a top series that supports the top-rail section and a bottom series that supports the bottom-rail section.

In Example 8, the subject matter of any one or more of Examples 1-7 optionally include wherein the contoured tooling rail has a contoured fence form factor including left-right-top- and bottom rail sections, further including: a series of support bars that extend from a base and supports the tooling rail, including a left series that supports the left-rail section, a right series that supports the right-rail section, a top series that supports the top-rail section and a bottom series that supports the bottom-rail section.

In Example 9, the subject matter of any one or more of Examples 1-8 optionally include wherein the contoured tooling rail has a contoured fence form factor including left-right-top- and bottom rail sections, further including: a series of support bars that extend from a base and supports the tooling rail, including a left series that supports the left-rail section, a right series that supports the right-rail section, a top series that supports the top-rail section and a bottom series that supports the bottom-rail section; and wherein the edge-press molding element includes complementary left-right-top- and bottom edge-press sections, and wherein the top edge-press section includes a first inflection and a second inflection, and wherein each inflection creates at least a changed lateral layout.

In Example 10, the subject matter of any one or more of Examples 1-9 optionally include a protective coating on the cushion layer, wherein the protective coating is ceramic film; a cushion layer on the tooling rail, wherein the cushion layer is a metallic mesh; and a protective coating on the tooling rail, wherein the protective coating is a ceramic film.

Example 11 is a glass-bending tooling, comprising: an edge-press molding element, wherein the edge-press molding element has a gasket form factor, and wherein the edge-press molding element includes a steel material; a cushion layer on a contact surface of the edge-press molding element, wherein the cushion layer includes a metallic material; a protective coating on the cushion layer, wherein the protective coating is a ceramic film; and a stabilizer on the edge-press molding element opposite the contact surface.

In Example 12, the subject matter of Example 11 optionally includes wherein the gasket form factor is an X-Y surface and a Z-thickness, wherein the edge-press molding element includes a Z-direction contour.

In Example 13, the subject matter of any one or more of Examples 11-12 optionally include wherein the gasket form factor is an X-Y surface and a Z-thickness, wherein the edge-press molding element includes a Z-direction contour, further including: the cushion layer is a stainless-steel cloth that is welded to the edge-press molding element; and wherein the edge-press molding element is a stainless-steel material.

In Example 14, the subject matter of any one or more of Examples 11-13 optionally include wherein the gasket form factor is an X-Y surface and a Z-thickness, wherein the edge-press molding element includes a Z-direction contour, further including: the cushion layer is a stainless-steel cloth that is welded to the edge-press molding element, and a ceramic film that is bonded to the cloth; and wherein the edge-press molding element is a stainless-steel material.

In Example 15, the subject matter of any one or more of Examples 11-14 optionally include wherein the edge-press molding element has an asymmetrical contoured gasket form factor.

Example 16 is a method of bending glass, comprising: contacting a glass pane that is resting on a contoured tooling rail, with an edge-press molding element, wherein the edge-press molding element is configured with a shape that is complementary to the contoured tooling rail; wherein the edge-press molding element includes a cushion layer on a contact surface of the edge-press molding element; causing the glass pane to sag onto the contoured tooling rail under conditions to cause the edge-contacting press mold to continuously increase contact with the glass pane, and under conditions to create a temperature differential between a center region of the glass pane at a first temperature, and peripheral edge of the glass pane at a second temperature, wherein the first temperature is higher than the second temperature.

In Example 17, the subject matter of Example 16 optionally includes wherein the edge-contacting press mold contacts the glass pane under conditions to continuously increase contact with the glass pane under self-weight of the edge-press molding element, until the edge-contacting press mold completes full contact with the glass pane.

In Example 18, the subject matter of any one or more of Examples 16-17 optionally include wherein the edge-contacting press mold contacts the glass pane under conditions to continuously increase contact with the glass pane under self-weight of the edge-press molding element, until the edge-contacting press mold completes full contact with the glass pane, and wherein the temperature differential is less than or equal to 100° C.

In Example 19, the subject matter of any one or more of Examples 16-18 optionally include wherein a stabilizer is on the edge-press molding element, wherein while causing the glass pane to sag onto the contoured tooling rail, the stabilizer maintains a fiduciary configuration of the edge-press molding element with respect to the tooling rail.

In Example 20, the subject matter of any one or more of Examples 16-19 optionally include wherein the glass pane is a soda lime glass singlet material in a thickness range from 0.7 mm to 1 mm, and wherein the temperature differential is in a range from 30° C. to 100° C.

In Example 21, the subject matter of any one or more of Examples 16-20 optionally include wherein the glass pane is a soda lime glass material and an aluminosilicate composition, wherein the soda lime glass is thicker than the aluminosilicate composition, and wherein the edge-press molding element, presses through the cushion layer onto the aluminosilicate composition.

In Example 22, the subject matter of any one or more of Examples 16-21 optionally include wherein the glass pane is a soda lime glass material and an aluminosilicate composition, wherein the soda lime glass is thicker than the aluminosilicate composition, wherein the edge-press molding element, presses through the cushion layer onto the aluminosilicate composition, and wherein the temperature differential is in a range from 30° C. to 100° C.

In Example 23, the subject matter of any one or more of Examples 16-22 optionally include, wherein the glass pane is a soda lime glass material with a thickness of 2.1 mm, and an aluminosilicate composition with a thickness of 0.7 mm, wherein the edge-press molding element, presses through the cushion layer onto the aluminosilicate composition, and wherein the temperature differential is in a range from 30° C. to 60° C.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A glass-bending tooling for bending glass in a direction, comprising:
    a contoured tooling rail;

an edge-press molding element, wherein the edge-press molding element circumferentially follows a form factor, wherein the form factor comprises a thickness measured in the direction and a width being measured perpendicular to the direction, wherein the width is greater than the thickness, wherein the width of the edge-press molding element is greater than a width of the contoured tooling rail measured perpendicular to the direction; and a cushion layer on a contact surface of the edge-press molding element, wherein the edge-press molding element is configured to press the contoured tooling rail via its own self weight, wherein edge-press molding element comprises a body of material that extends inward from a periphery thereof by the width.

2. The glass-bending tooling of claim 1, wherein the cushion layer is a stainless-steel cloth.

3. The glass-bending tooling of claim 2, wherein the stainless-steel cloth is welded onto the edge-press molding element.

4. The glass-bending tooling of claim 1, wherein the edge-press molding element comprises a width-to-thickness ratio in a range from 10:1 to 3:1.

5. The glass-bending tooling of claim 4, wherein the edge-press molding element includes a stainless-steel material.

6. The glass-bending tooling of claim 5, wherein the edge-press molding element further comprising a stabilizer, wherein the stabilizer maintains a fiduciary configuration of the edge-press molding element with respect to the tooling rail.

7. The glass-bending tooling of claim 1, wherein the contoured tooling rail further comprises: left, right, top, and bottom-rail sections, the glass-bending tooling further comprising:

a series of support bars that extend from a base and support the tooling rail, the series of support bars including a left series that supports the left-rail section, a right series that supports the right-rail section, a top series that supports the top-rail section and a bottom series that supports the bottom-rail section.

8. The glass-bending tooling of claim 1, wherein the contoured tooling rail comprises left, right, top, and bottom rail-sections, the glass-bending tooling further comprising:

a series of support bars that extend from a base and supports the tooling rail, the series of support bar including a left series that supports the left-rail section, a right series that supports the right-rail section, a top series that supports the top-rail section and a bottom series that supports the bottom-rail section; and wherein the edge-press molding element includes complementary left-, right-, top-, and bottom-edge-press sections, wherein the top edge-press section includes a first inflection and a second inflection.

9. The glass-bending tooling of claim 1, further comprising:

a protective coating on the cushion layer, wherein the protective coating is a ceramic film;

a second cushion layer on the tooling rail, wherein the second cushion layer is a metallic mesh; and a protective coating on the tooling rail, wherein the protective coating is a ceramic film.

10. The glass-bending tooling of claim 1, wherein the width is greater than or equal to 5 mm and less than or equal to 50 mm.

11. The glass-bending tooling of claim 10, wherein the thickness is greater than or equal to 2 mm and less than or equal to 15 mm.

12. The glass-bending tooling of claim 1, wherein the edge-press molding element comprises curvature contours that are smaller than complementary curvature contours of the tooling rail.

13. The glass-bending tooling of claim 12, wherein sections of the edge-press molding element comprise smaller arcs of curvature than corresponding sections of the tooling rail.

* * * * *